United States Patent
Milanese et al.

(10) Patent No.: US 10,218,799 B2
(45) Date of Patent: Feb. 26, 2019

(54) OPTIMIZING CLIENT DISTANCE TO NETWORK NODES

(71) Applicant: International Business Machines Corporation, Armonk, NY (US)

(72) Inventors: Nicola Milanese, Rome (IT); Stefano Sidoti, Rome (IT); Andrea Tortosa, Rome (IT)

(73) Assignee: International Business Machines Corporation, Armonk, NY (US)

(*) Notice: Subject to any disclaimer, the term of this patent is extended or adjusted under 35 U.S.C. 154(b) by 195 days.

(21) Appl. No.: 15/207,538

(22) Filed: Jul. 12, 2016

(65) Prior Publication Data
US 2018/0020064 A1    Jan. 18, 2018

(51) Int. Cl.
H04L 12/917    (2013.01)
H04L 29/08    (2006.01)
H04L 12/733    (2013.01)
H04L 12/66    (2006.01)

(52) U.S. Cl.
CPC .............. *H04L 67/18* (2013.01); *H04L 12/66* (2013.01); *H04L 45/122* (2013.01)

(58) Field of Classification Search
CPC ........ H04L 67/18; H04L 43/16; H04L 45/122
See application file for complete search history.

(56) References Cited

U.S. PATENT DOCUMENTS

| | | | |
|---|---|---|---|
| 6,061,334 A * | 5/2000 | Berlovitch | H04L 12/46 370/255 |
| 6,078,960 A | 6/2000 | Ballard | |
| 6,724,733 B1 | 4/2004 | Schuba et al. | |
| 7,433,315 B2 * | 10/2008 | Bhatia | H04L 1/0001 370/237 |
| 8,451,735 B2 | 5/2013 | Li | |
| 8,578,027 B2 | 11/2013 | Brown et al. | |
| 9,723,069 B1 * | 8/2017 | Fallows | H04L 67/1002 |

(Continued)

FOREIGN PATENT DOCUMENTS

| | | |
|---|---|---|
| CN | 101835202 A | 9/2010 |
| WO | 03065659 A1 | 8/2003 |

(Continued)

OTHER PUBLICATIONS

Wireless client load balancing for high-density deployment, posted at <http://help.fortinet.com/fos50hlp/54/Content/FortiOS/fortigate-wireless-54/client-load-balance.htm> on Jun. 15, 2016.*

(Continued)

*Primary Examiner* — Scott B Christensen
(74) *Attorney, Agent, or Firm* — Gilbert Harmon, Jr.

(57) ABSTRACT

Methods, computer program products and computer systems for optimizing client distances to nodes in a distributed computing environment are provided. A first registration request is received by a first node from a first client. The first node determines if a second client associated with the first node is suitable for an exchange to a second node. The first node sends a migration request to the second client responsive to determining the second client is suitable. The first node accepts the first registration request responsive to the second client connecting to the second node via a second registration request.

20 Claims, 5 Drawing Sheets

(56) References Cited

U.S. PATENT DOCUMENTS

| | | | |
|---|---|---|---|
| 2003/0061356 A1* | 3/2003 | Jason, Jr. | H04L 41/5035 709/227 |
| 2006/0056422 A1* | 3/2006 | Berkvens | H04L 12/66 370/401 |
| 2006/0067232 A1* | 3/2006 | Lee | H04L 45/122 370/235 |
| 2013/0166748 A1 | 6/2013 | Christenson et al. | |
| 2014/0258533 A1* | 9/2014 | Antony | H04L 29/08144 709/226 |
| 2016/0100340 A1* | 4/2016 | Kim | H04W 36/0083 370/332 |
| 2017/0006039 A1* | 1/2017 | Ernohazy | H04L 63/102 |
| 2017/0135104 A1* | 5/2017 | Emmanuel | H04L 12/44 |

FOREIGN PATENT DOCUMENTS

| | | |
|---|---|---|
| WO | 2011078646 A1 | 6/2011 |
| WO | 2014146996 A1 | 9/2014 |

OTHER PUBLICATIONS

"Hop (networking)", Wikipedia, the free encyclopedia, last modified on Feb. 3, 2016, <https://en.wikipedia.org/wiki/Hop_(networking)>, 2 pages.

"Introducing the Global Site Selector", Cisco Global Site Selector CLI-Based Global Server Load-Balancing Configuration Guide, OL-8944-01, Chapter 1, printed on May 5, 2016, 42 pages.

* cited by examiner

OPTIMIZING CLIENT DISTANCE TO NETWORK NODES

BACKGROUND

The present invention relates generally to the field of network nodes, and more particularly to client hops in a network.

Network nodes in a distributed computing environment, e.g., a network with a client/server architecture, are hardware devices acting as connection points for receiving and transmitting data. Network nodes can be any of the following, but are not limited to, gateways, routers, modems and switches. A gateway can provide client management functionality by appropriately routing data between clients and servers in the network. A gateway can further act as protocol converter for interoperability amongst devices connected to the gateway. A gateway can be configured to have certain operational constraints, such as a maximum number of connected clients and/or a maximum workload that can be supported in terms of computing resources associated with the gateway.

A network hop refers to one segment of a path in the network between two connection points, e.g., a client and a network node or a client and a server. A network hop may be an intermediate hardware device on the path which receives and transmits data. An intermediate hardware device can be, for example, but is not limited to, a router. Sent data can incur latencies associated with each network hop and therefore, a greater number of network hops typically results in proportionally diminished real-time performance associated with data transmission across the network.

SUMMARY

According to one embodiment of the present invention, a method for optimizing client distances to nodes in a distributed computing environment is provided. The method comprises receiving, by a first node, a first registration request associated with a first client; determining, by the first node, if a second client associated with the first node is suitable for an exchange to a second node; responsive to determining the second client is suitable, sending, by the first node, a migration request to the second client; and responsive to the second client connecting via a second registration request to the second node, accepting, by the first node, the first registration request, wherein the first client connects to the first node. A corresponding computer program product and computer system are also disclosed herein.

DETAILED DESCRIPTION

Embodiments of the present invention recognize that network communications can be improved by an optimization of client distance to network nodes, e.g., gateways. Sometimes, a client device connected to a gateway is located far from the gateway, in terms of network hops between the client device and the gateway. This can be based, for example, on a comparison to an average number of network hops between clients and the gateway. Gateways which are far from clients may be less responsive in handling communications from those clients. In many cases, there are other gateways in the network which the client device could connect to with fewer network hops in between.

Embodiments of the present invention therefore provide a solution for improving network efficiency wherein the distance of clients to network nodes, for example, in terms of network hops, is systematically optimized. This can be accomplished without disrupting the balance of network node client loads, i.e., the number of clients connected to each node. Embodiments disclosed herein can improve network efficiency by exchanging clients between nodes in a network to systematically reduce the total number of network hops.

In describing embodiments in detail with reference to the figures, it should be noted that references in the specification to "an embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, describing a particular feature, structure or characteristic in connection with an embodiment, one skilled in the art has the knowledge to affect such feature, structure or characteristic in connection with other embodiments whether or not explicitly described.

Figure 1:
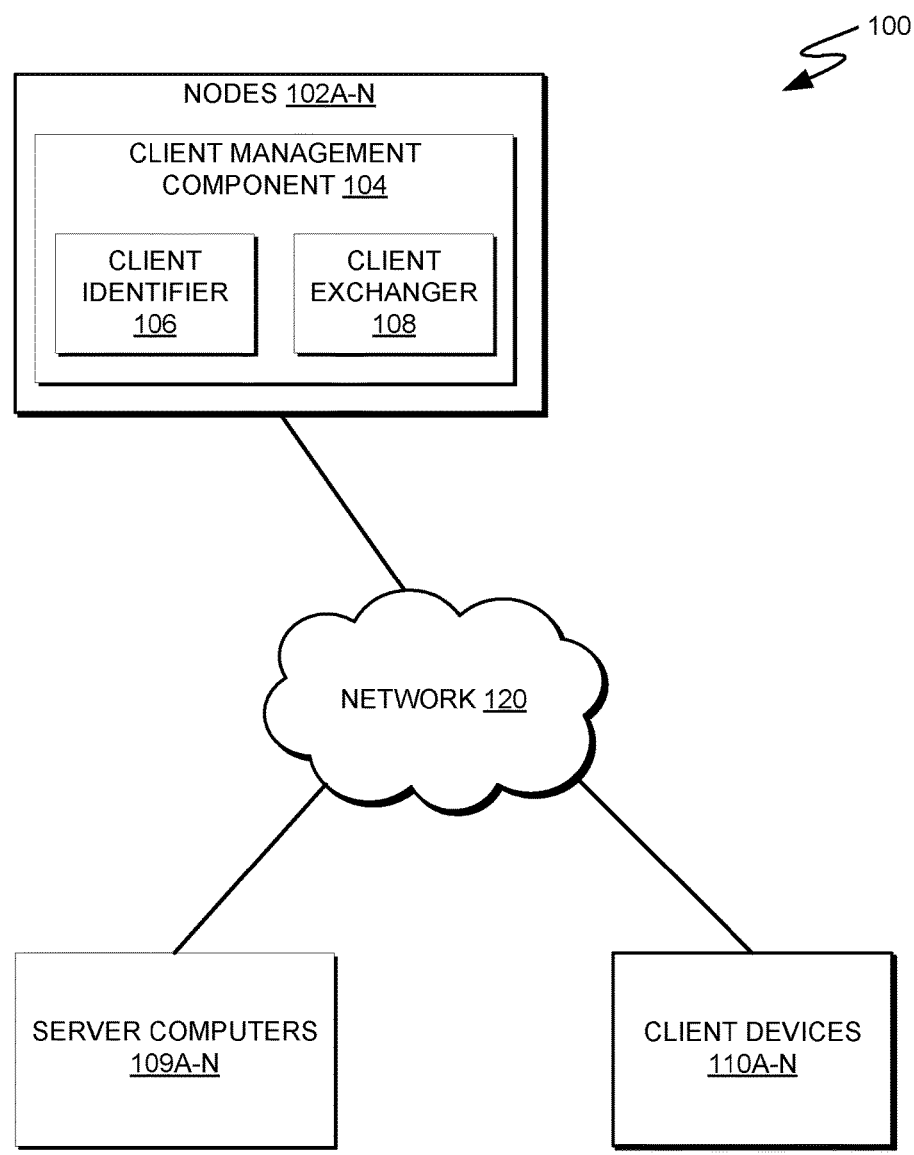
FIG. 1 is a functional block diagram illustrating a distributed data processing environment, in accordance with an embodiment of the present invention.

The present invention will now be described in detail with reference to the figures. FIG. 1 is a functional block diagram illustrating a distributed data processing environment 100, in accordance with one embodiment of the present invention. Distributed data processing environment 100 comprises nodes 102A-N, server computers 109A-N and client devices 110A-N, all interconnected over network 120.

Server computers 109A-N can be laptop computers, tablet computers, netbook computers, personal computers (PCs), desktop computers, personal digital assistants (PDAs), smart phones, or any programmable electronic devices capable of communicating with nodes 102A-N via network 120. Server computers 109A-N can be devices configured for serving requests received from clients 110A-N. Server computers 109A-N are generally representative of any number of computing devices.

In various embodiments of the present invention, client devices 110A-N can each respectively be a laptop computer, tablet computer, netbook computer, personal computer (PC), a desktop computer, a personal digital assistant (PDA), a smart phone, or any programmable electronic device capable of communicating with server computers 109A-N and nodes 102A-N via network 120. Client devices 110A-N are generally representative of any number of computing devices.

Nodes 102A-N are hardware devices such as, but not limited to, gateways, routers, modems and switches. Nodes 102A-N are generally representative of any plurality of such devices. In some embodiments, nodes 102A-N can be computer systems which function as gateways. Nodes 102A-N can be configured to receive and transmit communications between server computers 109A-N and clients 110A-N.

Figure 4:
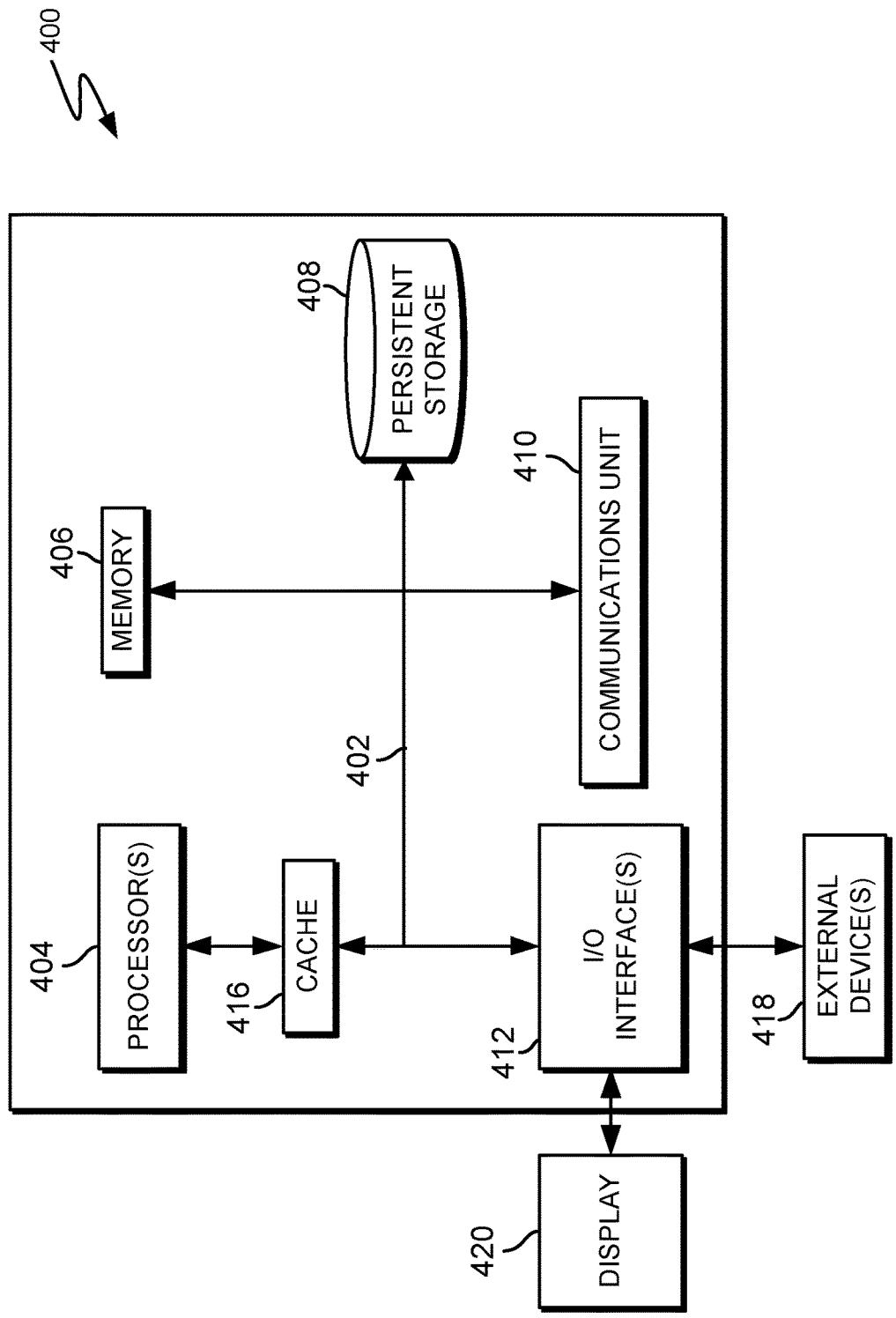
FIG. 4 is a block diagram of components of the network nodes executing the client management component, in accordance with an embodiment of the present invention.

Nodes 102A-N may include internal and external hardware components, as depicted and described in further detail with respect to FIG. 4.

Nodes 102A-N comprise client management component 104 for improving network efficiency by optimizing client distances to nodes 102A-N. Client management component 104 further comprises client identifier 106 and client exchanger 108. Client identifier 106, associated with a first node, e.g., node 102A, can identify a client connected to the first node. The client identified is determined to be suitable for an exchange with another client to another node, in order to reduce the total number of network hops across the network. Client exchanger 108 can create and send a migration request to the identified client and accept or reject registration requests from clients connected to other nodes, as will be subsequently discussed in greater detail.

Network 120 can be, for example, a local area network (LAN), a wide area network (WAN) such as the Internet, or a combination of the two, and can include wired, wireless, or fiber optic connections. In general, network 120 can be any combination of connections and protocols that will support communications between server computers 109A-N, client devices 110A-N and nodes 102A-N.

Figure 2:
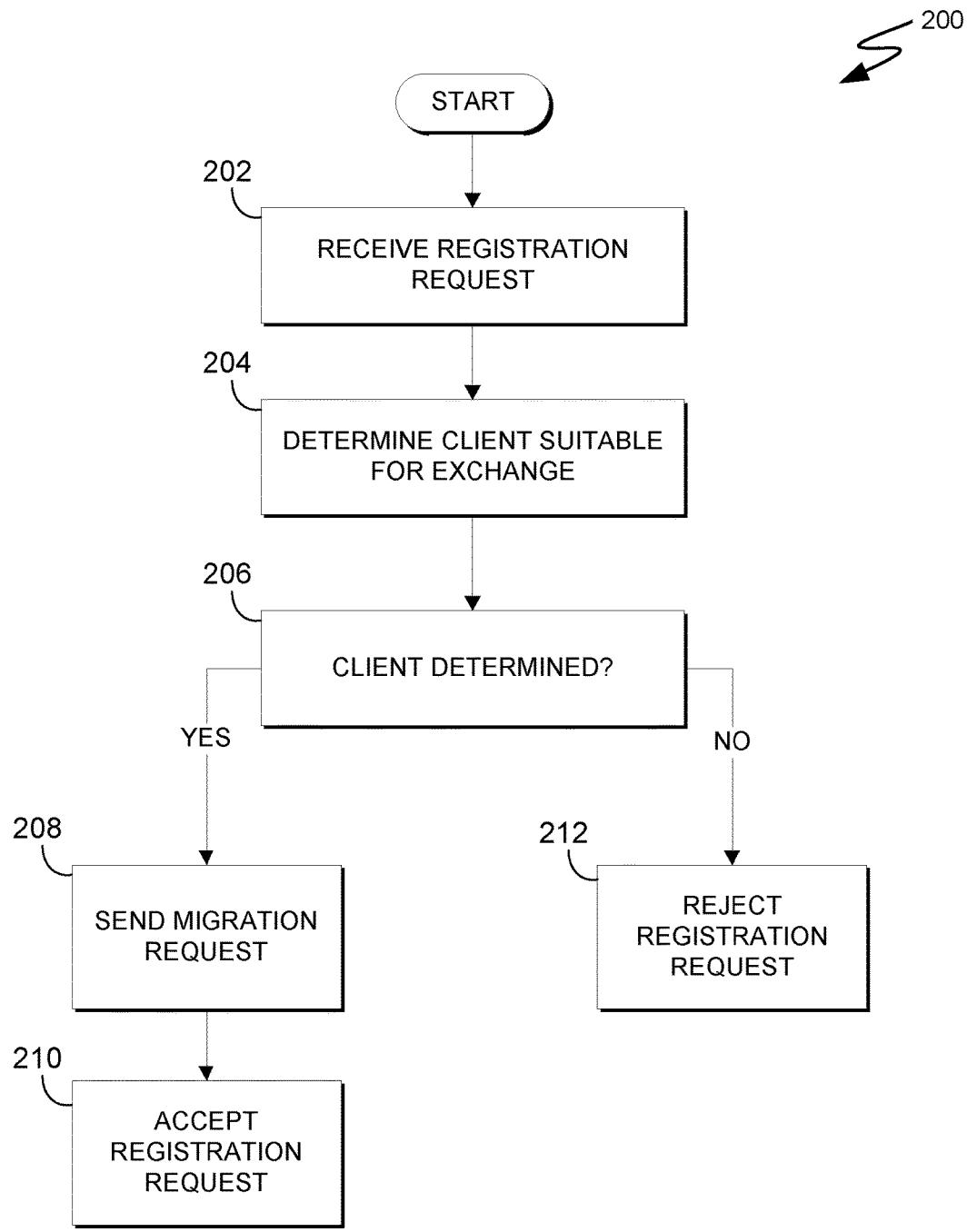
FIG. 2 is a flowchart depicting operational steps of a client management component on a network node within the data processing environment of FIG. 1, in accordance with an embodiment of the present invention.

FIG. 2 is a flowchart 200 depicting operational steps of client management component 104 for optimizing client distances to network nodes, in accordance with an embodiment of the present invention. Client management component 104, operating on a first node, e.g., node 102A, receives a first registration request from a first client, e.g., client 110A (step 202). The first client is connected to a second node, e.g., node 102B, and may exceed a distance metric to the second node. The distance metric can be a predetermined or dynamically configured parameter and can be, but is not limited to, a threshold number of network hops.

The second node may have sent the first client a first migration request for connecting to the first node. In some embodiments, a threshold number of network hops comprising a distance metric can be determined by an average number of network hops (from clients connected to a gateway) added to a preconfigured percentage of the average number of network hops. Responsive to receiving migration requests, clients 110A-N can create and send registration requests to nodes 102A-N for connecting to them.

A migration request can comprise for example, but is not limited to, identification information associated with the node sending the migration request (e.g., the second node) and a list of identification information associated with one or more alternate nodes which the client can attempt to connect to (e.g., the first node). The alternate nodes can be determined based on, for example, being within a threshold distance to a client, in terms of geographical distance. Clients that receive migration requests can store, e.g., cache, the list of alternate nodes and update the stored list when receiving new migration requests.

It should be noted that clients receiving migration requests can calculate how far each alternate node is from them, in terms of network hops. For example, clients can send tracer messages to the alternate nodes to determine how many network hops away from the alternate nodes they are. The clients can sort the list of alternate nodes in order of fewest network hops to most network hops.

The first registration request can comprise for example, but is not limited to, identification information associated with the second node (i.e., the node the first client is connected to), a number of network hops from the first client to the second node and a number of network hops from the first client to the first node.

Client identifier 106, operating on the first node, determines if a second client, e.g., client 110B, connected to the first node is suitable for an exchange to a second node (step 204). The determination can be based on, for example, the second client exceeding the distance metric in terms of network hops to the first node. Alternatively, responsive to receiving the first registration request, the second client can be determined on the basis of reducing the total number of network hops across the network, accomplished via a client exchange.

For example, responsive to receiving the first registration request, the second client can be determined by the first node to be within a threshold distance (e.g., geographical distance) to the second node, which can comprise suitability for an exchange. The second client may be an additional number of network hops away from the second node than the second client is from the first node. However, if the additional number of network hops the second client would gain by connecting to the second node is less than the number of network hops the first client would lose by connecting to the first node, the second client can send a registration request to the second node for connecting to it. Alternatively, if the second client is within the threshold number of network hops away from the second node or fewer network hops away from the second node than the first node, the second client can send a registration request to the second node. The foregoing examples comprise situations where the total number of network hops across the network can be reduced by a client exchange.

If client management component 104 (operational on the first node) has received the first registration request and/or a suitable client has been determined (step 206, YES branch), client exchanger 108 (operating on the first node) creates a second migration request and sends the second migration request to the second client (step 208). The second migration request can comprise, for example, identifying information associated with the first node and the second node. Responsive to receiving the second migration request, the second client can create a second registration request for sending to the second node, requesting to connect. If the second node accepts the second registration request from the second client, client exchanger 108 (operating on the first node) accepts the first registration request from the first client, wherein the first client will connect to the first node (step 210). By way of this exchange of clients, the number of clients per node, i.e., client load, is maintained for the first and second nodes.

Alternatively, if a registration request has not been received by client management component 104 (operational on the first node) but the second client has been determined to exceed a threshold number of network hops to the first node (step 206, YES branch), client exchanger 108 can create and send a migration request to the second client (step 208). The migration request can comprise, for example, identifying information associated with the first node and a list of alternate nodes which the second client can attempt to connect to via sending registration requests. If a registration request is received by the first node from a client associated with any of the alternate nodes (step 202), client exchanger 108 (operational on the first node) can accept the registration request for connecting to the client (step 210), wherein the second client can at that point connect to an alternate node.

If client management component 104 (operational on the first node) has received the first registration request but a suitable client has not been determined, i.e., a failure to determine a suitable client, (step 206, NO branch), client exchanger 108 (operational on the first node) rejects the first registration request from the first client (step 212). For example, if there are no clients connected to the first node that are within a threshold distance (e.g., geographical distance) to the second node, the first registration request can be rejected. The first client will not connect to the first node if the first registration request is rejected. Responsive to receiving a registration request rejection, the first client can send another registration request to another node on a list of alternate nodes associated with a migration request sent to the first client. The first client can send registration requests to alternate nodes in an order such as from fewest network hops to most network hops, etc.

According to some embodiments, a multi node client exchange can be executed for reducing the total number of network hops across the network. For example, client management component 104 (operational on the first node) receives the first registration request from the first client. If client identifier 106 (operational on the first node) does not determine a second client suitable for exchanging to the second node (to which the first client is connected), client identifier 106 can determine a second client for being suitable to exchange to a third node. Client exchanger 108 (operational on the first node) can send a migration request to the second client with identifying information associated with the third node, wherein the second client can create and send a registration request to the third node.

If the third node can determine a connected client suitable for an exchange to the second node (i.e., the node from which the first client is migrating), the third node can send a migration a request to the suitable client for connecting the suitable client to the second node. If the suitable client connects to the second node (e.g., via a registration request sent by the suitable client), the third node can accept the registration request from the second client, the first node can accept the first registration request from the first client and the client loads for each node will be maintained. In general, this procedure for a multi node client exchange can be extended to any number of network nodes until a suitable client is determined for connecting to the second node.

Figure 3A:
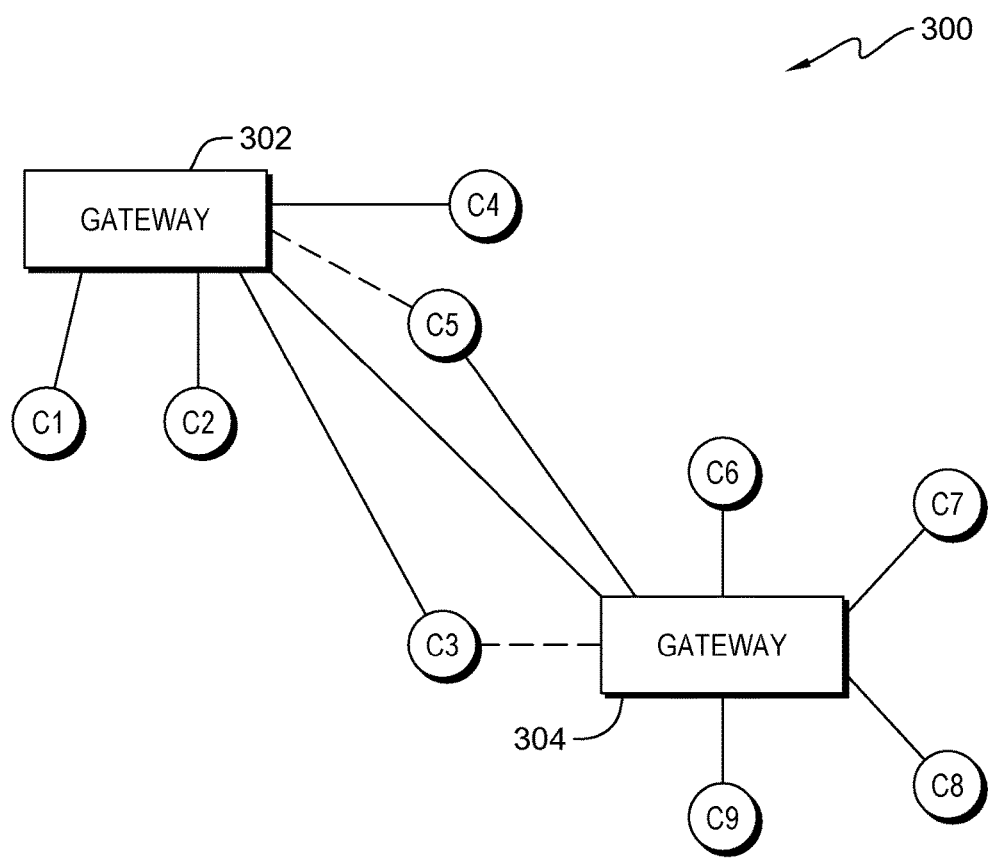
FIGS. 3A-B illustrate example network configurations of clients connected to gateways, in accordance with embodiments of the present invention.

FIG. 3A illustrates a network configuration 300 of clients connected to network gateways, in accordance with an embodiment of the present invention. Network configuration 300 can comprise other devices (e.g., nodes, clients and servers) which are not depicted. Clients C1, C2, C3 and C4 are connected to gateway 302 and the connection is represented by a solid line. Clients C5, C6, C7, C8 and C9 are connected to gateway 304. Gateways 302 and 304 are operable for appropriately routing connected clients to servers (not depicted). The distance between a client and a gateway in FIG. 3A represents a quantity of network hops between the client and the gateway. For example, since client C1 is closer to gateway 302 than client C3 is, there are fewer network hops between client C1 and gateway 302 than there are between client C3 and gateway 302. Gateways 302 and 304 are communicatively connected, represented by a solid line connecting the gateways.

Gateway 302, comprising client management component 104, uses client identifier 106 to determine that client C3 exceeds a distance metric to gateway 302, e.g., a threshold number of network hops. Client exchanger 108, operational on gateway 302, sends a migration request to client C3 once the client has been determined as exceeding the distance metric. The migration request identifies, for example, gateway 304 for being within a threshold distance (e.g., geographical distance) to client C3. Responsive to receiving the migration request, client C3 creates and sends a registration request to gateway 304. The dashed line between client C3 and gateway 304 represents the request for client C3 to connect via the registration request.

When client management component 104, operational on gateway 304, receives the registration request from client C3, gateway 304 uses client identifier 106 to determine a client suitable for exchanging to gateway 302. Client identifier 106 determines that client C5 is within a threshold distance (e.g., geographical distance) to gateway 302, thus client C5 is identified, e.g., determined to be suitable for an exchange. Responsive to identifying client C5, client exchanger 108, operational on gateway 304, sends client C5 a migration request for connecting to gateway 302. Client exchanger 108 can accept the registration request from client C3 if, for example, gateway 302 accepts a registration request from client C5. The dashed line from client C5 to gateway 302 represents a request from client C5 to connect to gateway 302.

Figure 3B:
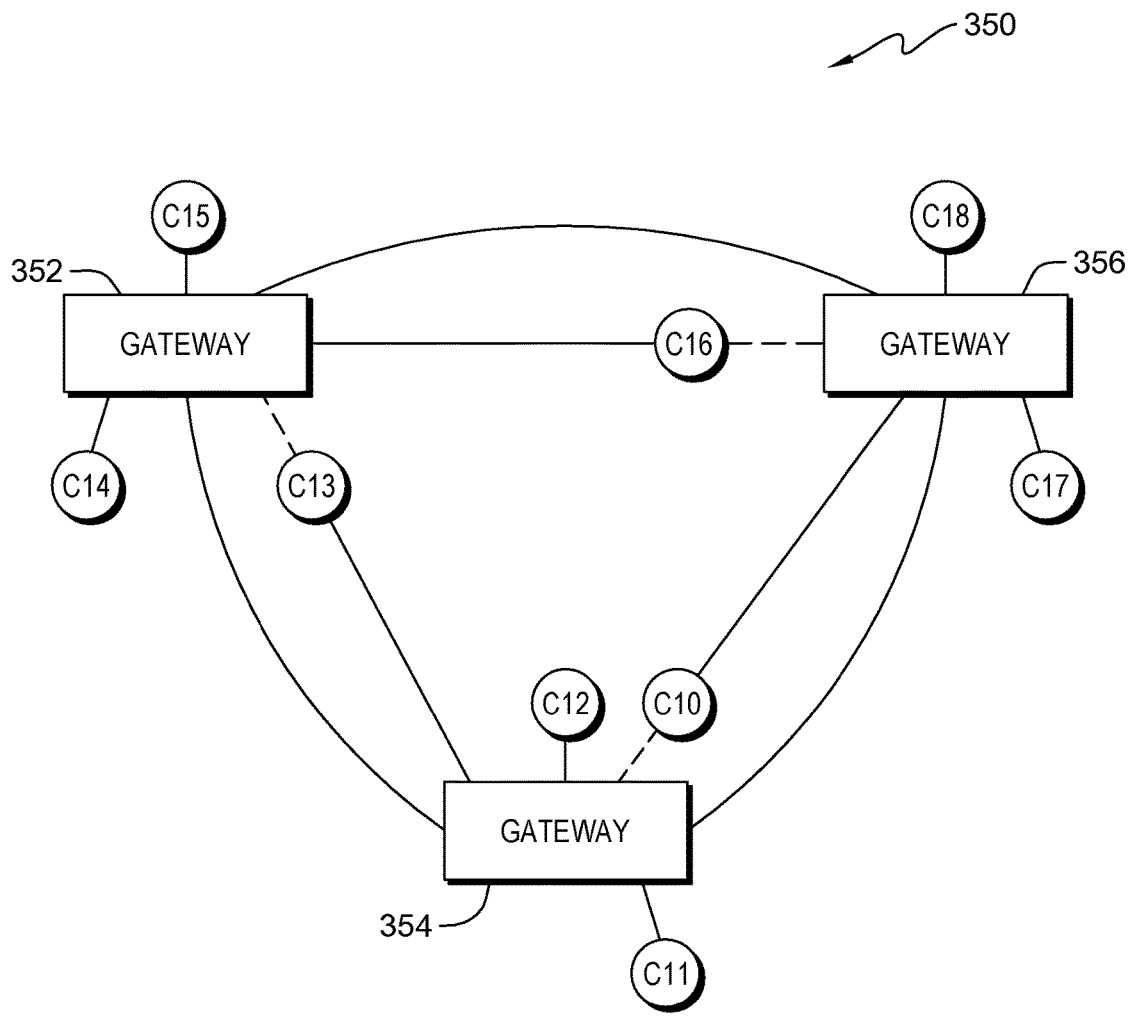

FIG. 3B illustrates a network configuration 350, in accordance with an embodiment of the present invention. Network configuration 350 can comprise other devices (e.g., nodes, clients and servers) which are not depicted. Clients C13, C14 and C15 are connected to gateway 352 and the connection is represented with a solid line. Clients C10, C11 and C12 are connected to gateway 352, and clients C16, C17 and C18 are connected to gateway 356. Gateways 352, 354 and 356 are operable for appropriately routing connected clients to servers (not depicted). The distance between a client and a gateway in FIG. 3B represents a quantity of network hops between the client and the gateway. Gateways 352, 354 and 356 are communicatively connected, represented solid lines connecting the gateways.

Gateway 352, comprising client management component 104, uses client identifier 106 to determine that client C16 exceeds a distance metric to gateway 352, e.g., a threshold number of network hops. Client exchanger 108, operational on gateway 352, sends a migration request to client C16 once the client has been determined as exceeding the distance metric. The migration request identifies gateway 356, for example, for being within a threshold distance to client C16. Responsive to receiving the migration request, client C16 creates and sends a registration request to gateway 356. The dashed line between client C16 and gateway 356 represents the request for client C16 to connect via the registration request.

When client management component 104, operational on gateway 356, receives the registration request from client C16, gateway 356 uses client identifier 106 to determine a client suitable for exchanging to another gateway in the network. Client identifier 106 determines that no clients connected to gateway 356 are within a threshold distance (e.g., geographical distance) to gateway 356, however client identifier 106 determines that client C10 is within a threshold distance (e.g., geographical distance) to gateway 354, thus client C10 is identified, e.g., determined to be suitable for an exchange to gateway 354. Responsive to identifying client C10, client exchanger 108, operational on gateway 356, sends client C10 a migration request for connecting to gateway 354. Client exchanger 108 can accept the registration request from client C16 if, for example, gateway 354 accepts a registration request from client C10.

When client management component 104, operational on gateway 354, receives the registration request from client C10, gateway 354 uses client identifier 106 to determine a client suitable for exchanging to gateway 352 or another gateway in the network. Client identifier 106 determines that client C13 is within a threshold distance (e.g., geographical distance) to gateway 352, thus client C13 is identified, e.g., determined to be suitable for an exchange. Responsive to identifying client C13, client exchanger 108, operational on gateway 354, sends client C13 a migration request for connecting to gateway 352. Client exchanger 108 can accept the registration request from client C10 if, for example, gateway 352 accepts a registration request from client C13.

FIG. 3B is an example of a multi node client exchange in a network wherein the client load per each involved gateway is maintained. Registration requests sent by any clients discussed in FIGS. 3A and 3B are sent on the basis of reducing the total number of network hops, as previously discussed.

FIG. 4 depicts a block diagram 400 of components of nodes 102A-N, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Nodes 102A-N include communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Client management component 104 can be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 can provide communications through the use of either or both physical and wireless communications links. Client management component 104 can be downloaded to persistent storage 408 through communications unit 410.

I/O interface(s) 412 allows for input and output of data with other devices that can be connected to nodes 102A-N. For example, I/O interface 412 can provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., client management component 104, can be stored on such portable computer readable storage media and can be loaded onto persistent storage 408 via I/O interface(s) 412. I/O interface(s) 412 also connect to a display 420.

Display 420 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for optimizing client distances to nodes in a distributed computing environment, the method comprising:
   receiving, by a first node, a first registration request associated with a first client wherein the first registration request comprises a distance from the first client to the first node and a distance from the first client to a second node and wherein the first client is currently associated with the second node;
   determining, by the first node, if a second client associated with the first node is suitable for an exchange to the second node based on a distance between the second client and the second node being less than a distance between the second client and the first node;
   responsive to determining the second client is suitable, sending, by the first node, a migration request to the second client; and
   responsive to the second client connecting via a second registration request to the second node, accepting, by the first node, the first registration request, wherein the first client connects to the first node.

2. The method of claim 1, wherein the second client is determined to be suitable responsive to the first node receiving the first registration request.

3. The method of claim 2, wherein the second client sends the second registration request to the second node and the second node is associated with the first client.

4. The method of claim 1, wherein the second client is determined to be suitable on a basis of the second client exceeding a distance metric to the first node.

5. The method of claim 4, wherein the distance metric is associated with a threshold number of network hops from a client to the first node.

6. The method of claim 1, wherein the second client sends the second registration request to the second node and the second node is a node to which the first client is not connected.

7. The method of claim 1, further comprising:
responsive to a failure to determine the second client to be suitable, rejecting, by the first node, the first registration request.

8. A computer program product for optimizing client distances to nodes in a distributed computing environment, the computer program product comprising:
one or more non-transitory computer readable storage media and program instructions stored on the one or more non-transitory computer readable storage media, the program instructions comprising:
program instructions to receive, by a first node, a first registration request associated with a first client wherein the first registration request comprises a distance from the first client to the first node and a distance from the first client to a second node and wherein the first client is currently associated with the second node;
program instructions to determine, by the first node, if a second client associated with the first node is suitable for an exchange to the second node based on a distance between the second client and the second node being less than a distance between the second client and the first node;
program instructions to send, by the first node, a migration request to the second client, responsive to determining the second client is suitable; and
program instructions to accept, by the first node, the first registration request, wherein the first client connects to the first node, responsive to the second client connecting to the second node via a second registration request.

9. The computer program product of claim 8, wherein the second client is determined to be suitable responsive to the first node receiving the first registration request.

10. The computer program product of claim 9, wherein the second client sends the second registration request to the second node and the second node is associated with the first client.

11. The computer program product of claim 8, wherein the second client is determined to be suitable on a basis of the second client exceeding a distance metric to the first node.

12. The computer program product of claim 11, wherein the distance metric is associated with a threshold number of network hops from a client to the first node.

13. The computer program product of claim 8, wherein the second client sends the second registration request to the second node and the second node is a node to which the first client is not connected.

14. The computer program product of claim 8, further comprising:
program instruction to reject, by the first node, the first registration request responsive to a failure to determine the second client to be suitable.

15. A computer system for optimizing client distances to nodes in a distributed computing environment, the computer system comprising:
one or more computer processors;
one or more computer readable storage media;
program instructions stored on the one or more computer readable storage media for execution by at least one of the one or more processors, the program instructions comprising:
program instructions to receive, by a first node, a first registration request associated with a first client wherein the first registration request comprises a distance from the first client to the first node and a distance from the first client to a second node and wherein the first client is currently associated with the second node;
program instructions to determine, by the first node, if a second client associated with the first node is suitable for an exchange to the second node based on a distance between the second client and the second node being less than a distance between the second client and the first node;
program instructions to send, by the first node, a migration request to the second client, responsive to determining the second client is suitable; and
program instructions to accept, by the first node, the first registration request, wherein the first client connects to the first node, responsive to the second client connecting to the second node via a second registration request.

16. The computer system of claim 15, wherein the second client is determined to be suitable responsive to the first node receiving the first registration request.

17. The computer system of claim 16, wherein the second client sends the second registration request to the second node and the second node is associated with the first client.

18. The computer system of claim 15, wherein the second client is determined to be suitable on a basis of the second client exceeding a distance metric to the first node.

19. The computer system of claim 15, wherein the second client sends the second registration request to the second node and the second node is a node to which the first client is not connected.

20. The computer system of claim 15, further comprising:
program instruction to reject, by the first node, the first registration request responsive to a failure to determine the second client to be suitable.

* * * * *